Jan. 26, 1954
V. RODZIANKO
2,667,611
INDUCTION MOTOR FOR FAMILY SEWING MACHINE DRIVES
Filed Dec. 21, 1951
2 Sheets-Sheet 1
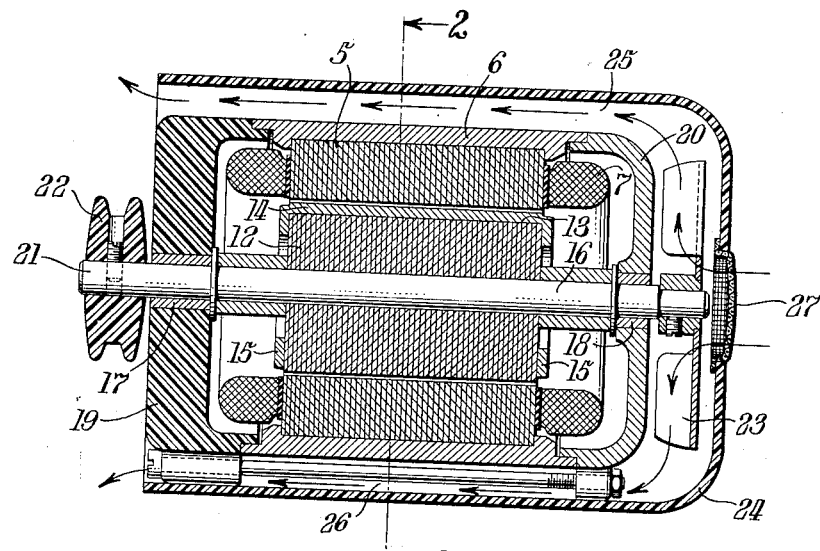
Fig. 1.
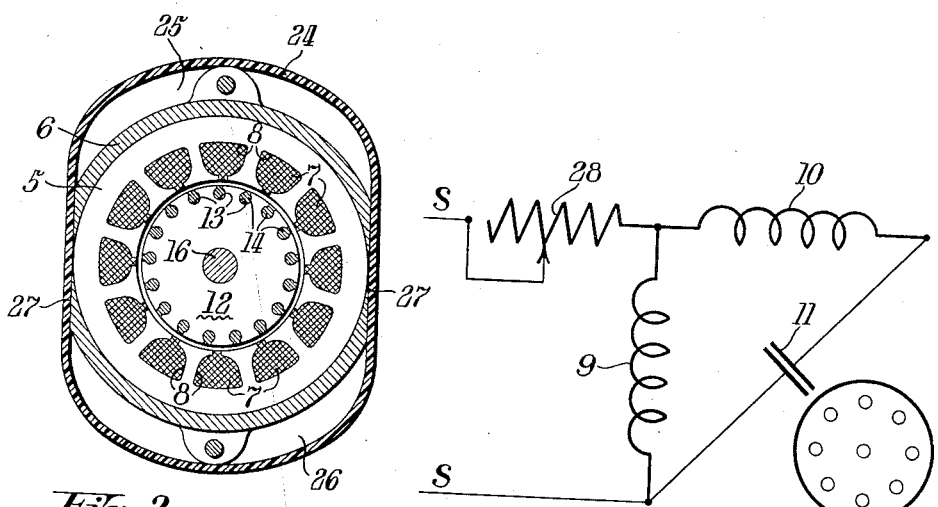
Fig. 2.
Fig. 4.
WITNESS
Nicholas Leszczak
INVENTOR.
Victor Rodzianko
BY
William P. Stewart
ATTORNEY

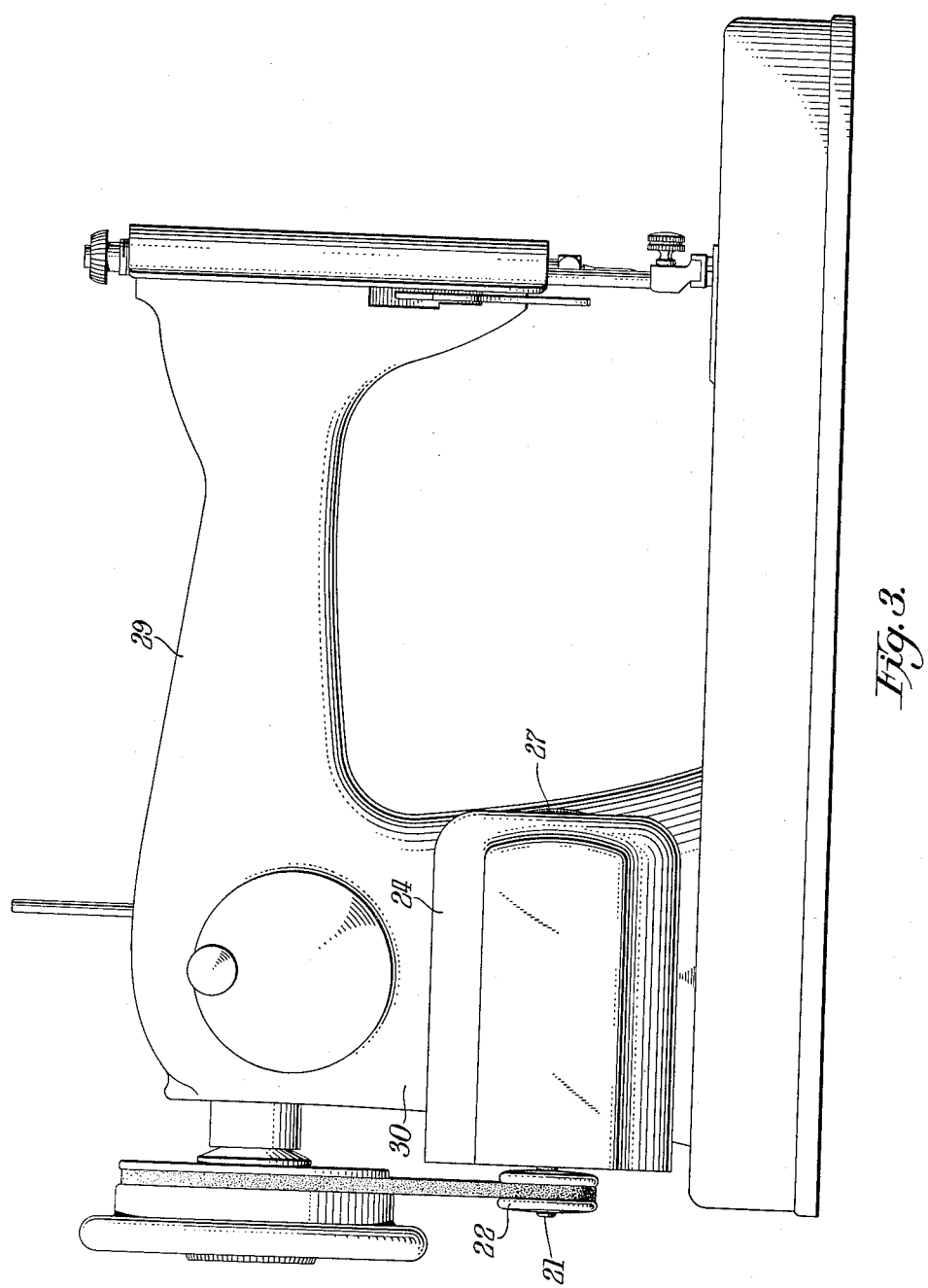

Patented Jan. 26, 1954

2,667,611

UNITED STATES PATENT OFFICE 2,667,611

INDUCTION MOTOR FOR FAMILY SEWING MACHINE DRIVES

Victor Rodzianko, Cranford, N. J., assignor to The Singer Manufacturing Company, Elizabeth, N. J., a corporation of New Jersey Application December 21, 1951, Serial No. 262,766

4 Claims. (Cl. 318—220)

This invention relates to an induction motor for driving a family sewing machine and more specially to an induction motor of the permanent-split capacitor type having critical ranges for certain of its design constants which provide suitable torques and sufficiently low losses to permit the small frame size demanded by this application.

The ordinary general-purpose, permanent-split, capacitor induction motor is not satisfactory for driving a sewing machine at variable speed and any such motor designed in the usual way would either be too large and heavy or, if compressed into the space now allotted to the commutator type motor for this application, would run too hot or fail to develop sufficient starting torque.

It is an object of this invention, therefore, to produce a permanent-split, capacitor induction motor by the use and correlation of new design constant emphasis and ranges which will result in a motor having an unusually low value of full load losses per unit starting torque.

This invention is particularly directed toward single-phase fan-cooled motors of full load rating of approximately 15-20 watts output and having outside case dimensions of approximately 4½ inches in length by 3¼ inches in maximum diameter, the capacitor being mounted outside the case. These dimensions have been established as the maximum that can be allowed and still provide a motor of practical size for use with a regular family sewing machine from the standpoint of mounting said motor more or less out-of-sight in proximity to or partially or entirely within the hollow standard of the sewing machine, and consistent with a reasonable temperature rise.

As is well known, family sewing machines are commonly driven by a series, commutator type motor which generally has a full load speed of approximately 6000 R. P. M., which corresponds to a sewing machine arm-shaft speed of about 1200 R. P. M. This series type of motor is notorious for the severe radio interference it creates. The customary line filters and shielding, while they reduce the severity of this interference, by no means eliminate the difficulty. The present invention, however, does eliminate this interference at its source by dispensing with the commutator and brushes and employing an induction motor in place of the series, commutator motor for applications where alternating current supplies are available and which, today, fortunately constitute the great majority of the applications.

It is, of course, essential that the induction motor require no more space than the series commutator motor it replaces. This is not an easy requirement because the highest practical full-load rotor speed for an induction motor connected to a 60 cycle supply is approximately 3450 R. P. M. or about one half the full-load armature speed of the present regular commutator motor used for this application. It is well known that, for fixed current and flux densities, the output per unit volume of a dynamoelectric machine is proportional to the angular velocity of the rotor. Thus the induction motor normally requires a frame size much larger than that for the series, commutator motor. But, according to this invention, the induction motor has substantially the same over-all dimensions as the series, commutator motor. This has, in part, been accomplished by employing a slightly larger rotor diameter and increasing the stack length to include the space formerly taken up by the commutator and brushes. However, the small frame size is also made possible by a calculated choice of design-constants and a range for their values which has substantially minimized the full-load losses consistent with adequate starting torque.

Further, it is essential that a proper torque-speed characteristic be obtained. One of the most important considerations is that the locked-torque be high, which, in a permanent-split capacitor motor, is not easily compatible with low load-losses. An additional requirement is that a regular series-resistance type controller may be successfully used with the induction motor in its application to the speed control of a sewing machine.

In the present state of the art, there appears to be much confusion surrounding the proper choice for "K" (the ratio of effective capacitor winding turns to effective main winding turns) in those permanent-split capacitor motors which are allegedly designed for adjustable speed control by means of series reactance or resistance.

For example, the following U. S. patents are listed with the respective values of "K" as recommended therein: 1,725,558, August 20, 1929, Ballman, $K=3$ to 5; 1,934,060, November 7, 1933, Hanning, $K=1.5$; 2,091,665, August 31, 1937, Weber, $K=1.8$.

It is apparent that this single criterion is not sufficient to define the best motor for the job. Regardless of the specific novelty of any given value for "K" per se, however, the value of "K," according to this invention, is to be considered as only one element of a number of design-constants which are to be taken into consideration, together, as defining an overall combination or organization of design-constants which has resulted in making possible for the first time the use of an induction motor of practical size for driving family type sewing machines at adjustable and variable speeds.

Another criterion which establishes the proper motor is the ratio of $r2/X$, where $r2$ is the resistance, in ohms, of the squirrel-cage rotor referred to the stator, and $X$ is the short-circuit reactance, in ohms, of the primary. The electrical size of the capacitor is important in controlling the full-load losses and it can desirably be rendered dimensionless by employing the ratio $Xc/X$ where $Xc$ is the reactance, in ohms, of the capacitor and $X$ is the short-circuit reactance, in ohms, of the primary.

It is an object of this invention, therefore, to provide a novel design for a squirrel-cage permanent-split capacitor induction motor embodying some or all of the considerations which have been referred to hereinabove, and other considerations which will be pointed out in the following description and claims, and illustrated in the accompanying drawings, wherein:

Fig. 1 is a central longitudinal section of a motor embodying the invention.

Fig. 2 is a transverse section taken on line 2—2 of Fig. 1, showing the shapes of the stator and rotor slots.

Fig. 3 is a view showing one form of motor mounting for driving a sewing machine.

Fig. 4 is a circuit diagram showing connections between a source of electrical energy, the motor and a speed control rheostat.

Throughout this specification, reference will be made to certain well-known design quantities for induction motors, which are defined as follows: "$X$" is the short-circuit reactance; that is, it represents the reactance of the main primary winding under locked-rotor conditions. It is well known that the value of this reactance can be readily calculated from test readings of volts, amperes and watts, taken respectively under no-load and locked conditions. "$r2$" is the resistance of the rotor winding figured at 25° C. and referred to the main primary and may also be determined from the same test readings as used to determine "$X$" above. Reference may be made to the article "Segregation of Losses in Single Phase Induction Motors" by C. G. Veinott appearing on pages 1302–1306 of Electrical Engineering (official publication of the American Institute of Electrical Engineers) for December 1935 for the method of calculating these constants from test readings.

"K" is the ratio of the effective capacitor winding turns to the effective main winding turns and may be determined directly from the number and distribution of the turns of the respective windings in the stator slots.

"$Xc$" is the reactance of the phase-splitting capacitor and is determined by direct measurement.

The above quantities are well known to motor designers and their calculation from test data is a matter of ordinary design procedure. However, it has not been known heretofore what ranges of values these quantities, or rather certain ratios of these quantities, should have to bring an induction motor of the permanent split-phase capacitor type into the realm of possibility as a suitable driving means for family sewing machines. According to the present invention, a critical range has been established for certain of these ratios, which eliminates much of the customary cut-and-try procedure and considerably narrows the field in which the most suitable motor is to be found. A departure from the ranges of values laid down herein produces a motor which either is too large, runs too hot, or does not develop sufficient torque.

The lower-speed induction motor according to this invention has further advantages over the high-speed series commutator type motor. A larger belt pulley at the motor may be used because of the lower speed-reduction required. This results in greater belt wrap on the motor pulley and, therefore, lower motor bearing pressures and friction for a given power transmitted. There are, of course, no brushes to require servicing and no brush friction to add to the losses and finally the dynamic balancing is less critical for the lower-speed induction motor.

Referring to Fig. 1, the invention is shown, by way of example, as being embodied in a totally-enclosed motor with external fan cooling, having a stator core 5 of stacked, magnetizable laminations held within a stator frame 6 preferably of die-cast material. A primary winding 7 carried within slots 8 in the stator core 5 actually comprises two separate windings 9 and 10, positioned with their respective pole centers spaced at 90 electrical degrees in the manner well known for split-phase motor windings. Winding 9 will be designated as the main primary winding and winding 10 as the auxiliary primary or capacitor winding, and the permanent electrical circuit relation between them is as shown in Fig. 4 wherein the capacitor winding 10 is in series with a capacitor 11 and this series combination is in shunt with the main winding. The capacitor 11 is preferably mounted outside the motor.

A rotor core 12 is formed with partially open slots 13 in which are carried die-cast bars 14 joined electrically at each end of the core by integrally-cast end rings 15—15 to form a regular squirrel-cage winding. The rotor core 12 is carried by a shaft 16 which is journaled in bearings 17 and 18 positioned respectively in end-covers 19 and 20 which, together with the frame 6, form the motor case. Preferably the end cover 19 is made of molded insulating material so as to serve as a supporting element, electrically insulating the motor from the sewing machine 29 to which it may be attached by any conventional means and thus provides the relative positioning of parts as shown in Fig. 3.

The shaft 16 terminates at one end in a power take-off portion 21 to which a belt-pulley 22 may be secured. Secured to the other end of the shaft 16 is a fan 23 for providing a stream of cooling air over the exterior surfaces of the motor case as indicated generally by the arrows in Fig. 1. The ventilating path is defined by a shield 24 made preferably of a molded insulating material which surrounds the motor case in spaced relation thereto and forms therewith longitudinal airduct portions 25 and 26, except at the flat portions 27 of the motor case at which points said shield may be secured to the motor case by any convenient means. One end of the shield is formed with a central aperture and covered with a filter grill 27, which aperture serves as an air intake opening for the fan 23.

For controlling the speed of the motor, an adjustable resistor 28 is connected in series circuit relation with the motor and a source S—S of alternating current in the same manner as for a regular commutator type motor.

Reference to Fig. 3 will reveal that the motor according to the invention, when in use for driving a family sewing machine, is substantially hidden behind the upright portion 30 of the overhanging arm. Essentially, the motor is interchangeable with the conventional commutator type motor, the relative lower speed being taken off by the larger motor pulley 22 to provide the same machine arm-shaft speed for the induction motor drive as for the commutator motor drive.

According to the present invention it has been determined that there are certain ratios of design constants and certain numerical ranges for these ratios which may be set forth to define an induction motor suitable in respect to dimensions, torque and heating for the application of driving a conventional family sewing machine and employing for the speed control thereof an ordinary resistance-type foot-controller or the equivalent.

The ratio $r2/X$ should be between the limits 1.75 and 2.50; the ratio $K$ should be between the limits 1.7 and 2.0; and the ratio $Xc/X$ should be between the limits 17 and 29. It is to be understood that these ratios enable the designer to substantially fix within limits the wire size and turns for the primary windings, the sectional area of the rotor bars and end rings, and the electrical size of the capacitor.

It has been found that a motor built in accordance with this invention exhibits a percentage current input variation with load changes of much less value than for the conventional series, commutator motor. For example, the conventional commutator motor ordinarily shows at least a 65% variation in the current input as the load changes from no load to full load, while the current variation for the induction motor of this invention for the same load range is substantially less than 25%. This fact has an important bearing on the speed regulation, especially where, as in this case, there is a series resistance involved. The net effect of this smaller current change with load variation is that, when applied to sewing machines, any desired sewing speed can be maintained more closely, especially at low speeds where normally, with commutator motors, the tendency to stall is greatest.

A 2 pole, 60 cycle, 116 volt motor having the desirable characteristics herein described may be constructed in accordance with the following design data:

Stator core (flat sided):
    Outside diameter, inches _____ 2.313.
    Inside diameter, inches _____ 1.290.
    Stack length, inches _____ 2.0.
    Number of slots _____ 12.

Main winding:
    Conductors per slot _____ 210.
    Wire size _____ #30 copper.

Capacitor winding:
    Conductors per slot _____ 390.
    Wire size _____ #33 copper.

Rotor core:
    Outside diameter, inches _____ 1.274.
    Stack length, inches _____ 2.0.
    No. of bars (die cast aluminum) ____ 17.
    Air gap length (minimum) inches ___ .008.

Capacitor: Size _____ 4 mfd.

As many different embodiments of this invention may be made without departing from the spirit and scope thereof, it is to be understood that I do not limit myself to the specific embodiment thereof except as defined in the appended claims.

Having thus set forth the nature of the invention, what I claim herein is:

1. A single-phase induction motor of the permanent-split capacitor type comprising a main primary winding and an auxiliary primary winding mutually displaced in space phase by 90 electrical degrees, a squirrel-cage secondary winding, and a capacitor connected in circuit with said auxiliary primary winding, characterized by the ratio $r2/X$ being between the limits 1.75 and 2.50, the ratio $K$ being between the limits 1.7 and 2.0, and the ratio $Xc/X$ being between the limits 17 and 29, where $r2$ is the cold resistance of the rotor winding referred to the stator, $X$ is the short-circuit reactance of the main primary winding, $K$ is the ratio of the number of effective auxiliary winding turns to the number of effective main winding turns, and $Xc$ is the reactance of the capacitor at line frequency.

2. A single-phase induction motor of the permanent-split capacitor type comprising a main primary winding and an auxiliary primary winding mutually displaced in space phase by 90 electrical degrees, a squirrel-cage secondary winding, a capacitor connected in circuit with said auxiliary primary winding, and an adjustable resistance for controlling the magnitude of the voltage applied to said primary windings and thus the speed of said motor, characterized by the ratio $r2/X$ being between the limits 1.75 and 2.50, the ratio $K$ being between the limits 1.7 and 2.0, and the ratio $Xc/X$ being between the limits 17 and 29, where $r2$ is the cold resistance of the rotor winding referred to the stator, $X$ is the short-circuit reactance of the main primary winding, $K$ is the ratio of the number of effective auxiliary winding turns to the number of effective main winding turns, and $Xc$ is the reactance of the capacitor at line frequency.

3. An induction motor of small dimensions and of the permanent-split capacitor type for driving a family sewing machine at varying speeds through the agency of a series, adjustable resistance, comprising a main primary winding, an auxiliary primary winding spaced at 90 electrical degrees from said main winding, a squirrel-cage secondary winding, and a capacitor in series circuit relation with said auxiliary winding, characterized by the ratio $r2/X$ being between the limits 1.75 and 2.50, the ratio $K$ being between the limits 1.7 and 2.0, and the ratio $Xc/X$ being between the limits 17 and 29, where $r2$ is the cold resistance of the rotor winding referred to the stator, $X$ is the short-circuit reactance of the main primary winding, $K$ is the ratio of the number of effective auxiliary winding turns to the number of effective main winding turns, and $Xc$ is the reactance of the capacitor at line frequency.

4. A single-phase induction motor of the permanent-split capacitor type having an input current variation of less than 25% from no load to full load, and characterized by the ratio $r2/X$ being between the limits 1.75 to 2.50, the ratio $K$ being between the limits 1.7 and 2.0, and the ratio $Xc/X$ being between the limits 17 and 29, where $r2$ is the cold resistance of the rotor winding referred to the stator, $X$ is the short-circuit reactance, $K$ is the ratio of the number of effective capacitor winding turns to the number of effective main winding turns, and $Xc$ is the reactance of the phase-splitting capacitor at line frequency.

VICTOR RODZIANKO.

References Cited in the file of this patent

UNITED STATES PATENTS

| Number | Name | Date |
|---|---|---|
| 1,725,558 | Ballman | Aug. 20, 1929 |
| 1,726,230 | Kennedy | Aug. 27, 1929 |
| 1,934,060 | Hanning | Nov. 7, 1933 |
| 2,091,665 | Weber | Aug. 31, 1937 |

OTHER REFERENCES

Publ. "The Condenser Motor," by B. F. Bailey. Presented at the winter convention of the A. I. E. E., New York, N. Y., January 28–Feb. 1, 1929.